UNITED STATES PATENT OFFICE.

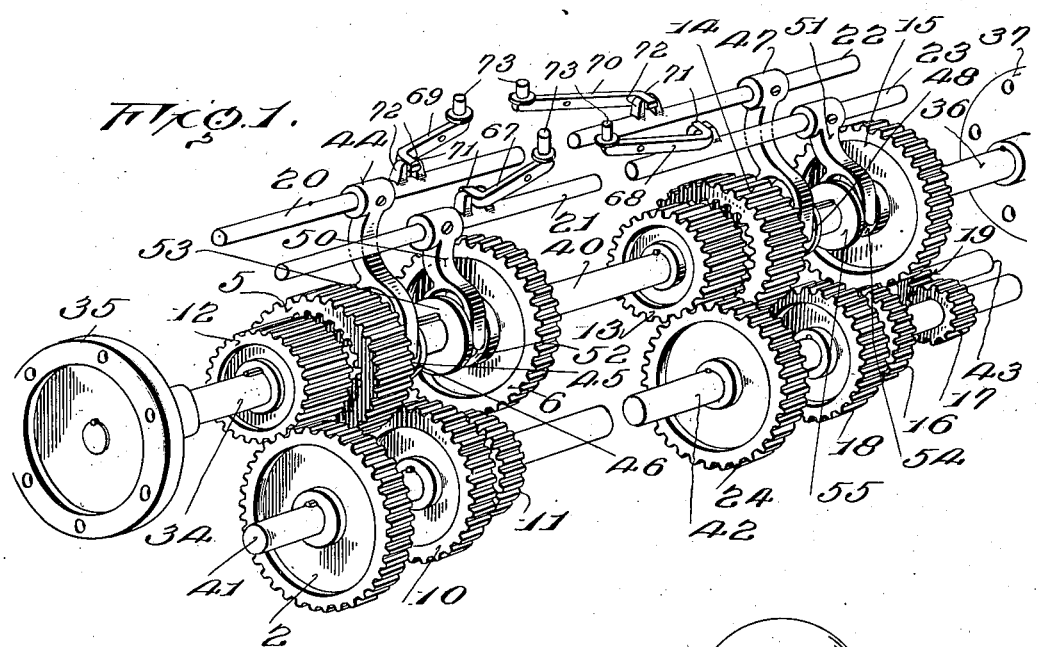

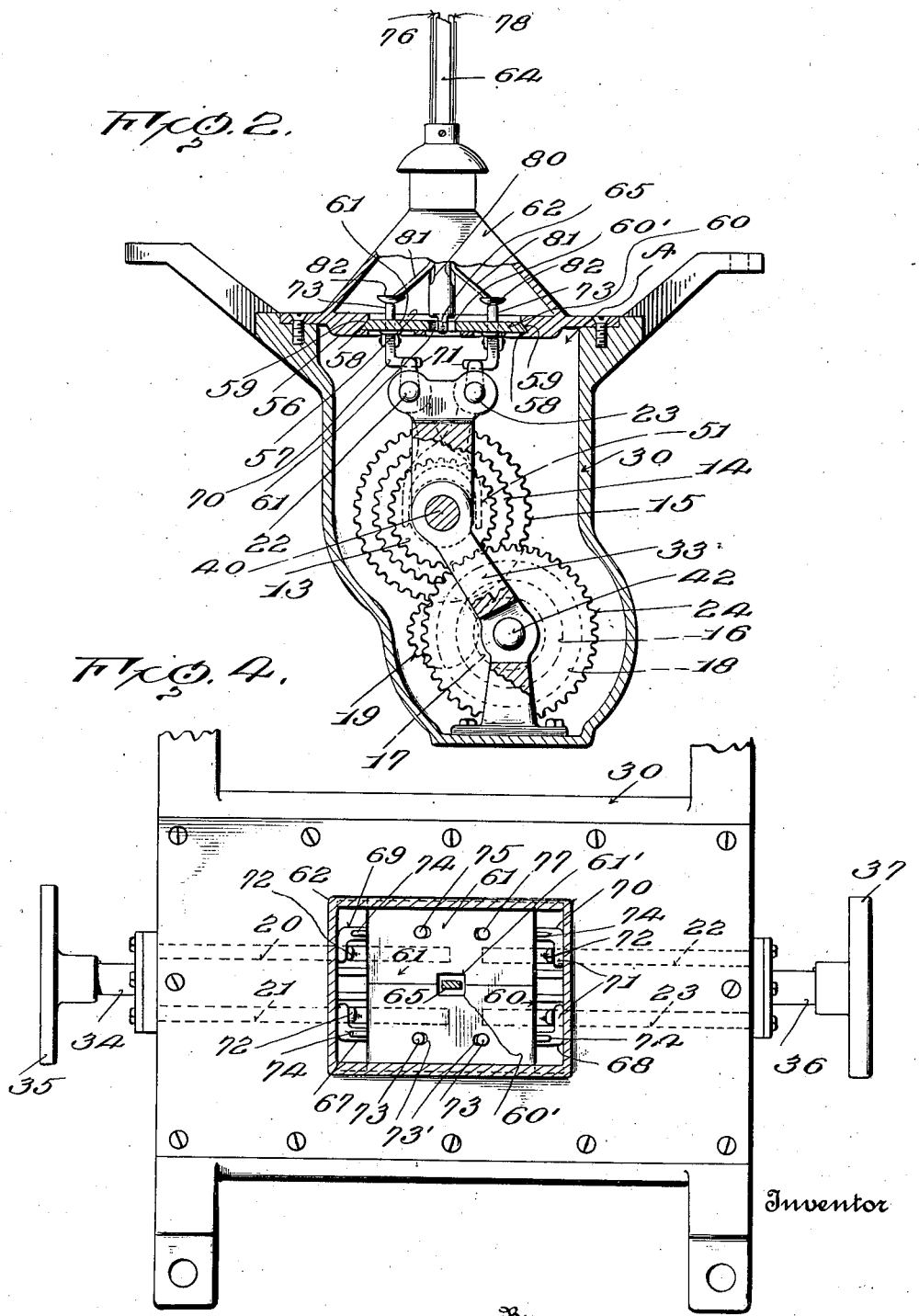

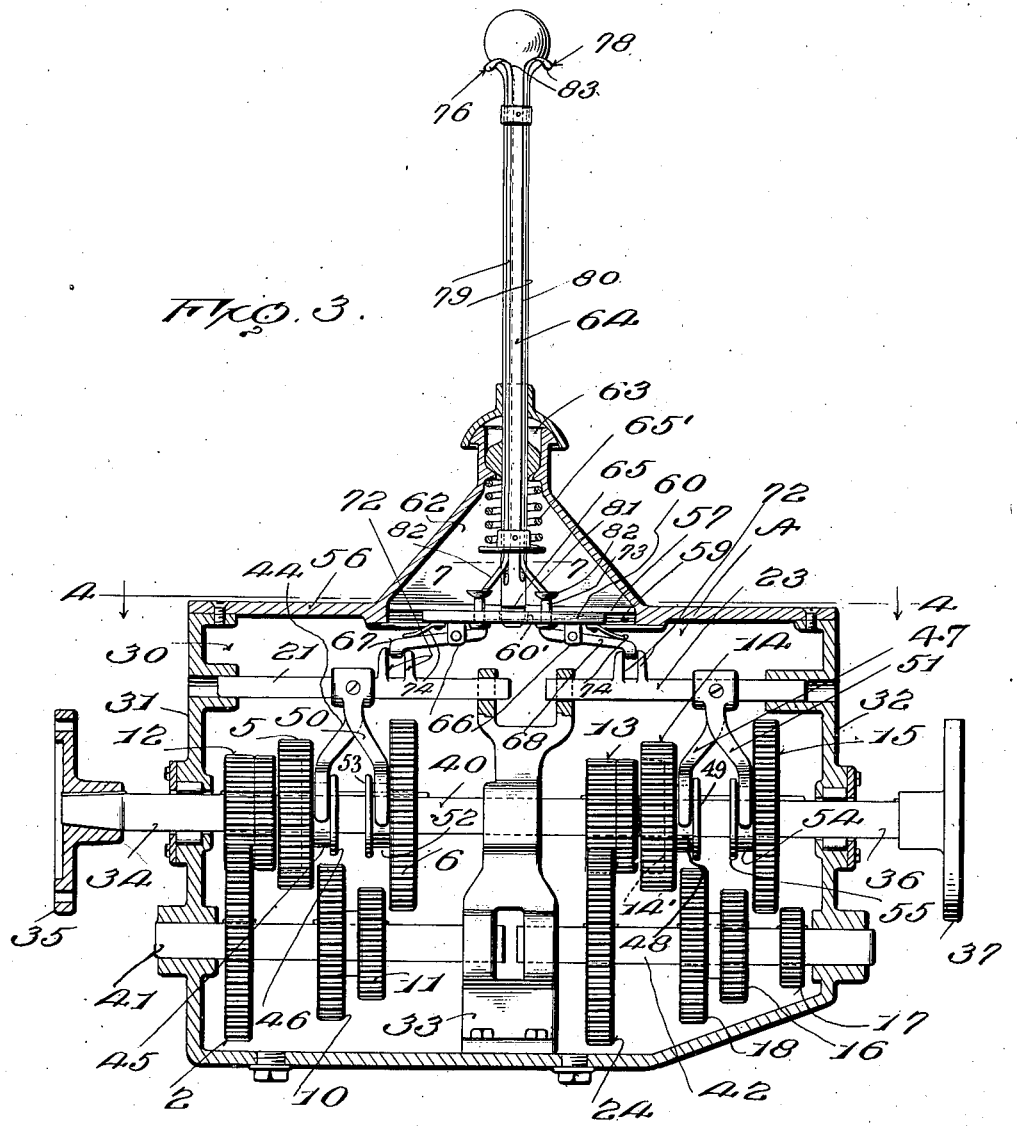

MARION A. GRIFFIN, OF PENELOPE, TEXAS, ASSIGNOR OF ONE-HALF TO JAMES D. FONVILLE, JR., OF SEYMOUR, TEXAS.

DUAL TRANSMISSION.

1,416,285.  Specification of Letters Patent.  Patented May 16, 1922.

Application filed October 13, 1919. Serial No. 330,188.

*To all whom it may concern:*

Be it known that I, MARION A. GRIFFIN, a citizen of United States, residing at Penelope, in the county of Hill, State of Texas, have invented certain new and useful Improvements in Dual Transmission; and I do hereby declare the following to be a full, clear, and exact description of the invention, such as will enable others skilled in the art to which it appertains to make and use the same.

This invention relates to transmission gearing of that type capable of producing various speed ratios between the driving and driven shafts, and has particular relation to transmission gearing of the selective type applicable especially to self propelled vehicles. An object of the invention is to produce a transmission gearing including, in effect, two gear change sets, operable independently of each other to produce a certain number of gear changes, or operable in conjunction with each other for the production of a greater number of gear changes.

Another object of the invention is to provide a novel gear shifting mechanism by means of which the several gear changes may be quickly and efficiently accomplished.

In the drawings:

Figure 1 is a perspective view, showing the shafting, the gears and a part of the shifting mechanism.

Figure 2 is a transverse section, taken centrally, with the shift lever in elevation.

Figure 3 is a longitudinal section through the casing.

Figure 4 is a top plan of the casing, partly in section.

Figure 5 is a top plan of the shift lever.

Figure 6 is a vertical section through a part of the shift lever.

Figure 7 is a section taken transversely through the shift lever with the sliding plates in plan.

Figure 8 is a detail section through two of the gears.

Referring now to the drawings, the present invention includes a transmission casing 30, of which the forward and rearward ends are indicated at 31 and 32 respectively, the forward end being that which lies in the direction of the motor in a self-propelled vehicle, and the rearward end being that which lies in the direction of the rear axle.

Centrally of the casing, therewithin, there is located a vertical web 33 which serves to support the shafting to be later described.

In the forward end wall of the casing, at the upper portion thereof, there is journaled a horizontal drive shaft 34, provided with means indicated at 35 for connecting it with a motor shaft. In the rear end wall of the casing there is journaled a horizontal driven shaft 36 provided with means indicated at 37 for connecting it with the propeller shaft of a vehicle. The shafts 34 and 36 are in axial alignment and are spaced from each other at their inner ends, these ends being provided with centrally located sockets 38 which receive the reduced end portions 39 of a transmission shaft 40 disposed between the shafts 34 and 36, and in axial alignment therewith. This shaft 40 is supported at its center in the upper portion of the web 33, as shown. These shafts constitute the main shafting line.

Journaled in the lower portion of the casing 30, there are two axially aligned jack shafts 41 and 42, the outer ends of which are supported in the end walls of the casing, while their inner ends are supported in the web 33.

Fast upon the drive shaft 34 inwardly of the casing, there is a gear 12 meshing with a considerably larger gear 2 carried by the jack shaft 41, this gear 2 being keyed to the jack shaft, and fast upon the transmission shaft 40 just rearwardly of the web 33, there is a gear 13 corresponding in size to the gear 12 and similar in all respects thereto. This gear 13 meshes with a gear 24 corresponding in size to the gear 2, and fixed upon the jack shaft 42.

Splined upon the transmission shaft 40 adjacent to its forward end, there is a gear 5 provided with an internally toothed socket 5', which is of such formation that the gear 5 in its sliding movement upon the shaft 40 may be shifted into and out of position to surround the gear 12, with the latter lying with its rearward portion within the socket 5' and with the teeth of the gear 12 meshing with the internal teeth of this socket. There is thus produced a clutch structure through the medium of which the transmission shaft 40 may be locked to the drive shaft 34 for direct drive thereby.

Fast upon the jack shaft 41 there is a gear 10, somewhat smaller than the gear 2, and this gear 10 is located rearwardly of the gear 2 and in position to receive the gear 5 into mesh therewith but the arrangement is such that in the rearward movement of the gear 5, it is disengaged from the gear 12 prior to its engagement with the gear 10. There is thus a neutral position for the gear 5 between the gears 10 and 12.

Splined upon the shaft 40 rearwardly of the gear 5 there is a gear 6 somewhat larger than the gear 5 and this gear 6 is shiftable forwardly into mesh with a gear 11 fast upon the jack shaft 41 rearwardly of the gear 10. The gear 11 is considerably smaller than the gear 10, as illustrated, but is larger than the gear 12. It is to be understood that the terms larger and smaller, as applied to these gears are intended to mean larger and smaller with relation to the number of peripheral teeth, as well as to diameter. As shown, the gear 6 may be shifted rearwardly out of engagement with the gear 11, after it has been engaged therewith, and there is thus a neutral position for the gear 6 also.

Splined upon the driven shaft 36, there is an internally socketed gear 14, its socket being illustrated at 14', and this gear is arranged to operate with respect to the gear 13 after the manner of operation of the gear 5 with respect to the gear 12, a second clutch structure being thus provided.

A gear 18 is fast upon the jack shaft 42 and is located for movement of the gear 14 into mesh therewith, the arrangement of these two gears corresponding to the arrangement of the gears 5 and 10.

Splined upon the shaft 36 rearwardly of the gear 14, there is a gear 15, corresponding to the gear 6 and movable into and out of meshing engagement with a gear 16 fast upon the jack shaft 42 and corresponding to the gear 11.

There is thus provided a pair of selective gear sets which may be operated independently, or in conjunction with each other, as will be later apparent.

Fast upon the jack shaft 42, rearwardly of the gear 16, there is a reverse pinion 17, which meshes with a pinion 19, carried by a shaft 43 journaled in the casing in parallel relation to the shaft just described. The gear 19 is so positioned that the gear 15 may be slid rearwardly into mesh therewith, but it is so disposed that the gear 15 does not enter mesh with the gear 19 until after it has been disengaged from the gear 16, so that there is a neutral position for the gear 15 between the two. The interposition of the gear 19 between the gears 15 and 17 will of course result in rotation of the shafts 36 and 42 in opposite directions, thus effecting a reverse as will be understood.

Slidably mounted in the upper portion of the casing, above the several shafts there are a series of longitudinally disposed shift rods indicated at 20, 21, 22 and 23. The shift rods 20 and 22 align axially at one side of the longitudinal median line of the casing, and the rods 21 and 23 align axially at the opposite side of this median line.

Carried by the shift rod 20 there is a downwardly extending yoke member 44, engaged in a groove 45, formed in an extension 46 projecting rearwardly from the gear 5. A similar yoke arm 47 extends downwardly from the shift rod 22, and is similarly engaged in a groove 48 formed in an extension 49 carried by the gear 14.

Yoke members 50 and 51 are carried by the shift rods 21 and 23 respectively, the yoke member 50 being engaged in a groove 52 formed in a forwardly projecting extension 53 carried by the gear 6 and the yoke member 51 is similarly engaged in a groove 54 formed in a forwardly projecting extension 55 carried by the gear 15. Thus, forward movement of the shift rod 20 engages the gear 5 over the gear 12. Rearward movement of the shift rod 20 brings the gear 5 into mesh with the gear 10, neutral position lying between the extremes of these two movements.

Forward movement of the shift rod 21 results in the meshing of the gear 6 with the gear 11. Rearward movement of this shift rod brings the gear 6 to neutral position.

Forward movement of the shift rod 22 engages the gear 14 over the gear 13, and rearward movement of this shift rod from the just stated position of these gears, first brings the gear 14 into neutral and subsequently engages this gear with the gear 18, this operation being identical with the operation of the shift rod 20 in its movement of the gear 5.

Forward movement of the shift rod 23 engages the gear 15 with the gear 16. Rearward movement of this shift rod from the just stated position of these gears first brings the gear 15 into neutral, and further rearward movement brings the gear 15 into engagement with the gear 19.

With the just described structure, a multiplicity of gear combinations and resultant ratios of rotation between the shafts 34 and 36 may be obtained.

With the gear 14 engaged over the gear 13 to effect a direct lock between the shafts 40 and 36, there is, of course, a direct drive from the shaft 40. If now, the gear 5 be engaged over the gear 12, there is direct drive completely through the transmission. If the gear 5 be meshed with the gear 10, there is produced an intermediate speed through the rotation of the gear 2 by the gear 12 turning the jack shaft 41 and the gear 10, carried by this jack shaft turning the gear 5. If the gear 5 be placed in neutral position and the gear 6 be engaged with the gear 11, a low speed is obtained. Thus the forward gear set may be operated independently of the rearward gear set giving the gear changes of the usual three speed transmission.

By the provision of the present structure, however, it is possible to obtain various speeds in reverse as well as in forward drives. It will be seen that if the gear 15, be meshed with the gear 19, the shaft 36 will be driven in the same direction as the shaft 42. This meshing of gears being, of course, accomplished with the gear 14 in neutral position. If, now, the gear 5 be meshed with the gear 10 the shaft 41, rotated by the gears 12 and 2 will rotate the shaft 40 through the medium of the gears 5 and 10, at intermediate speed. The shaft 40 rotates the shaft 42 through the medium of the gears 13 and 24 and the shaft 36 is rotated in the opposite direction through the medium of the gears 15, 17 and 19.

If, now, the gear 6 be meshed with the gear 11 and the gear 5 be brought to neutral position, a different speed ratio would be obtained. With the gear 5 engaged over the gear 12 and the gear 6 in neutral position, the gear 14 being also in neutral position, the usual reverse speed will be obtained.

By meshing gears 6 and 11 and gears 15 and 16, with the gears 5 and 14 in neutral position, a forward drive is obtained at a speed different from other possible gear combinations. By meshing gears 6 and 11 and gears 14 and 18, another speed ratio is obtained, and so on throughout all possible combinations of gears in the mechanism.

It is to be noted, especially that the results obtainable are due to the drive and driven shafts with the interposed axial transmission shaft, the two jack shafts, one positively geared to the drive shaft and the other geared positively to the transmission shaft and the means for establishing direct drive between the drive shaft, the driven shaft and the transmission shaft and for disconnecting these shafts, together with the means for establishing different gear connections between the transmission shaft and the jack shaft which is geared to the drive shaft and the means for establishing different gear connections between the driven shaft and the jack shaft which is geared to the transmission shaft.

For moving the shift rods 20, 21, 22 and 23 independently of each other and in various combinations, a special shifting mechanism is provided.

The top of the transmission casing is open as indicated at A, and a plate 56 serves as a closure for this opening. This plate has, itself, a central aperture 57, and the forward and rearward ends of the plate beyond the aperture are provided with transverse horizontal slots 58, the ends of which are beveled as indicated at 59, to conform to corresponding beveling of the sides of the aperture 57. These slots 58 thus form guide-ways for plates 60 and 61 slidably mounted therein for movement longitudinally of the casing 30. The plates are disposed with their inner edge faces in mutual engagement, and each plate is provided in its inner edge, centrally thereof with a rectangular recess, these recesses being indicated at 60' and 61' respectively.

Carried by the closure plate and extending upwardly therefrom, there is a housing 62, which surrounds the aperture 57 and which has in its top an opening 63, within which there is mounted for universal rocking movement a normally vertical shift lever 64. This shift lever has a transversely reduced lower end 65, the transverse dimension of this reduced portion being such as to allow the reduced portion to lie wholly within either of the recesses 60' and 61'. A spring 65' holds the lever 64 normally in vertical position, and when in such position the shift lever lies with its lower end portion 65 centrally of the space represented by the two recesses 60' and 61', the end faces of this reduced portion overlapping the end walls of both recesses so that, if the shift lever be rocked in its universal movement either straight forward or straight back, both of the plates 60 and 61 will be correspondingly moved. If the shift lever be first rocked laterally, its lower reduced end portion 65 will be brought into one of the recesses 60' and 61' when rocking movement of the shift lever either forward or back will result in corresponding movement of the engaged plate only.

Depending hangers are carried by the plates 60 and 61, two for each plate. These hangers are indicated at 66, and the hangers of each plate are located one adjacent to each end of the plate. In each of these hangers there is journaled for vertical movement a shifting dog, these several dogs being indicated at 67, 68, 69 and 70 respectively. The pivot points of these dogs are located between the ends thereof, and the dogs extend longitudinally of the shift plates 60 and 61, as illustrated.

The outer ends of the dogs are provided with lateral fingers 71 and the pivotal mounting of the dogs in their hangers 66 is such that they may be rocked to bring their fingers 71 into and out of engagement between pairs of upwardly extending lugs 72, carried, one pair by each of the shift rods 20, 21, 22 and 23. As shown in the drawing, the dog 67 is located to engage the lugs of the shift rod 21; the dog 68 is located to engage the lugs of the shift rod 23; the dog 69 is located in position to engage the lugs of the shift rod 20, and the dog 70 is similarly located to engage the lugs of the shift rod 22.

Each plate 60 and 61 is provided with an opening 73' above the inner end of each of the shift dogs and disposed in these openings there are vertical movable plungers 73 having flanged lower ends which rest upon the inner ends of the dogs. Springs 74 secured to the plates 60 and 61 bear upon the shifting dogs outwardly of their pivot points to hold these dogs with their outer ends depressed and with their inner ends elevated.

From the foregoing, it will be seen that since the dogs are movable into and out of engagement between the lugs 72 the shift rods 20, 21, 22 and 23 may be moved with the plates 60 and 61, in various combinations.

For disengaging the dogs selectively from their shift rods, a plunger actuating member is provided for each of the plungers 73. These plunger actuating members are indicated at 75, 76, 77 and 78 respectively, and actuate the plunger of the dogs 69, 67, 70 and 68 respectively. Each plunger actuated member consists of a rod including a straight upper portion 79 slidably engaged in a longitudinal channel 80 formed in the shifting lever 64, the lower portions of the rods being turned outwardly at an angle as indicated at 81 and being provided at their lower extremities with lateral heads 82 having convex undersurfaces arranged to engage against the upper ends of the plunger 73. The upper ends of the portions 79 of the rods are turned laterally as indicated at 83 to produce finger pieces by means of which the rods may be depressed, and the rods have some resilience so that when depressed, their upper ends will spring inwardly into sockets 84 formed at the upper ends of the channels 80 formed in the shift lever, the plunger actuating members being thus held into depressed position.

From the foregoing it will be apparent that depression of any one of the members 79 will result in disengagement of the corresponding dog from its shift rod, the dog moving into engagement with its shift rod when the member 79 is permitted to rise again.

From the foregoing, it will be seen that, with the plunger actuating members 76 and 77 depressed, a straight rearward rock of the upper portion of the shifting lever 64 will move both of the plates 60 and 61 forwardly and will engage the gear 5 over the gear 12, at the same time bringing the gear 15 into engagement with the gear 16. Forward rocking movement of the shift lever to its full extent, will mesh the gear 5 with the gear 10 and will bring the gear 15 into engagement with the reverse pinion 19.

With the plunger actuating members 75 and 78 depressed, a straight backward rock of the upper end of the shift lever will result in engagement of the gear 6 with the gear 11 and will bring the gear 14 into engagement over the gear 13.

Without depressing any of the plunger actuating members, a rocking motion of the upper end of the shift lever to the right will bring its lower end into the recess 60' and a rearward rock of the shift lever will engage the gear 6 with the gear 11 and the gear 15 with the gear 16. Movement of the shifting lever to the left and forward will mesh the gear 14 with the gear 18 and will mesh the gear 5 with the gear 10. Movement of the shifting lever forward from this position will engage the gear 5 over the gear 12 and the gear 14 over the gear 13, giving direct drive.

If the lever be shifted from neutral position to the left and forward, as just described to establish direct drive, and if the plunger actuating members 77 and 78 be then depressed to release the shift rods 22 and 23, the gear 14 will be left in engagement with the gear 13 and the shifting lever may then be operated to obtain various gear combinations in the forward gear set only. Correspondingly, the various reverse speeds may be obtained by first operating the shift lever to engage the gear 15 with the pinion 19, afterward releasing the dog 68 from the shift rod 23, the gear 14 being then in neutral position, when the forward gear set may be shifted to give any of its possible speed combinations in reverse.

From the foregoing it will be observed that means is provided for selectively producing any gear combination of which the present mechanism is capable.

What is claimed is:

A change speed gearing including a set of three axially alinged shafts, a second set of two axially aligned shafts parallel with the shafts of the first set, a gear rigid with one of the end shafts of the first set, a gear rigid with one of the shafts of the second set and meshing with the said first gear, a gear rigid with the intermediate shaft of the first set, a gear rigid with the other shaft of the second set and meshing with said gear of the intermediate shaft, means for positively connecting the shafts of the first set to effect direct drive therethrough, means for effecting different gear connections between the intermediate shaft and one of the shafts of the second set and means for effecting different gear connections between the other shaft of the second set and the remaining end shaft of the first set.

In testimony whereof, I affix my signature, in the presence of two witnesses.

MARION A. GRIFFIN.

Witnesses:
H. CRESWELL,
H. E. SMOYSTETA.